United States Patent
Shah et al.

(10) Patent No.: US 9,760,967 B2
(45) Date of Patent: Sep. 12, 2017

(54) SYSTEM AND METHOD OF DYNAMICALLY THROTTLING CPU FREQUENCY FOR GAMING WORKLOADS

(71) Applicant: QUALCOMM Incorporated, San Diego, CA (US)

(72) Inventors: Premal Shah, San Diego, CA (US); Brian Ellis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 14/448,556

(22) Filed: Jul. 31, 2014

(65) Prior Publication Data

US 2015/0130821 A1    May 14, 2015

Related U.S. Application Data

(60) Provisional application No. 61/903,843, filed on Nov. 13, 2013.

(51) Int. Cl.
| | |
|---|---|
| G06T 1/20 | (2006.01) |
| G09G 5/18 | (2006.01) |
| G06T 1/60 | (2006.01) |
| G06F 1/32 | (2006.01) |
| G06F 3/14 | (2006.01) |

(52) U.S. Cl.
CPC .............. *G06T 1/20* (2013.01); *G06F 1/324* (2013.01); *G06F 1/3206* (2013.01); *G06F 3/14* (2013.01); *G06T 1/60* (2013.01); *G09G 5/18* (2013.01); *G09G 2330/021* (2013.01); *G09G 2360/08* (2013.01); *Y02B 60/1217* (2013.01)

(58) Field of Classification Search
CPC ...................... G09G 2360/08; Y02B 60/1217
See application file for complete search history.

(56) References Cited

U.S. PATENT DOCUMENTS

| | | | |
|---|---|---|---|
| 7,711,966 B2 | 5/2010 | Prabhakaran et al. | |
| 7,770,034 B2 | 8/2010 | Nanja | |
| 8,001,531 B1 | 8/2011 | Rideout et al. | |
| 8,225,112 B2 | 7/2012 | Koul et al. | |
| 8,564,599 B2 | 10/2013 | Niederauer et al. | |
| 2008/0088635 A1* | 4/2008 | Callway | H04N 5/14 345/522 |

(Continued)

OTHER PUBLICATIONS

Dietrich, Benedikt; "Time Series Characterization of Gaming Workload for Runtime Power Management"; Oct. 7, 2013; IEEE Transactions on Computers; vol. 64, No. 1; pp. 260-273.*

(Continued)

*Primary Examiner* — Zhengxi Liu
*Assistant Examiner* — Jonathan M Cofino
(74) *Attorney, Agent, or Firm* — Haynes and Boone, LLP

(57) ABSTRACT

An example method of scaling a central processing unit (CPU) frequency of at least one CPU includes tracking an average quantity of graphics library calls made per graphics library draw call per frame of rendering. The method further includes detecting, based on tracking the average quantity of graphics library calls made per graphics library draw call per frame of rendering, a gaming workload on a computing device including a CPU. The method also includes switching the computing device to a gaming mode. Switching the computing device to a gaming mode includes reducing a CPU FMax of the CPU executing on the computing device.

30 Claims, 4 Drawing Sheets

(56) References Cited

U.S. PATENT DOCUMENTS

| | | | | |
|---|---|---|---|---|
| 2009/0289892 | A1* | 11/2009 | Cox | G06F 3/017 345/156 |
| 2010/0259536 | A1* | 10/2010 | Toksvig | G06F 9/524 345/418 |
| 2013/0106881 | A1 | 5/2013 | Hendry et al. | |

OTHER PUBLICATIONS

Dietrich et al., "DEMO: Power Management using Game State Detection on Android Smartphones", Jun. 2013, ACM, pp. 493-494.*

Dietrich et al., "Managing power for closed-source android os games by lightweight graphics instrumentation", Nov. 2012, IEEE Press, p. 10.*

Dietrich et al., "Lightweight graphics instrumentation for game state-specific power management in Android", Oct. 2014, Multimedia Systems, vol. 20, No. 5, pp. 563-578.*

Dietrich et al., "LMS-based low-complexity game workload prediction for DVFS", Oct. 2010, 2010 IEEE International Conference on Computer Design (ICCD), pp. 417-424.*

Angel E., et al., "Introduction to modern OpenGL programming", SIGGRAPH '12 ACM SIGGRAPH 2012 Courses, ACM, 2 Penn Plaza, Suite 701 New York NY 10121-0701 USA, XP058008341, DOI: 10.1145/2343483.2343485, ISBN: 978-1-4503-1678-1, Aug. 5, 2012 (Aug. 5, 2012), pp. 1-109.

Benedikt D., et al., "Time Series Characterization of Gaming Workload for Runtime Power Management", IEEE Transactions on Computers, IEEE Service Center, Los Alamitos, CA, US, vol. 64, No. 1, XP011566943, Oct. 7, 2013 (Oct. 7, 2013), pp. 260-273.

Guo S., et al., "Practical Game Performance Analysis Using Intel Graphics Performance Analyzers", Dec. 31, 2011 (Dec. 31, 2011), pp. 1-14, XP055166866, Retrieved from the Internet: URL: https://software.intel.com/sites/default/files/m/1/0/c/e/6/26750-PracticalPerformanceAnalysis_GPA.pdf.

International Search Report and Written Opinion—PCT/US2014/065045—ISA/EPO—dated Feb. 13, 2015.

Shi W., et al., "SHARC: A scalable 3D graphics virtual appliance delivery framework in cloud", Journal of Network and Computer Applications, Academic Press, New York, NY, US, vol. 34, No. 4, XP028211696, ISSN: 1084-8045, DOI: 10.1016/J.JNCA.2010.06.005, Jun. 7, 2010 (Jun. 7, 2010), pp. 1078-1087.

* cited by examiner

SYSTEM AND METHOD OF DYNAMICALLY THROTTLING CPU FREQUENCY FOR GAMING WORKLOADS

CROSS REFERENCE TO RELATED APPLICATIONS

This application claims the benefit of priority from U.S. Provisional Patent Application No. 61/903,843, filed Nov. 13, 2013, which is incorporated herein by reference.

FIELD OF DISCLOSURE

The present disclosure generally relates to a central processing unit (CPU) and a Graphics Processing Unit (GPU), and more particularly to controlling CPU frequency for GPU heavy workloads.

BACKGROUND

Dynamic CPU frequency scaling is a technique in computing systems where a CPU frequency is adjusted based on, for example, the CPU percentage load to conserve power. Dynamic CPU frequency scaling may be used in computing systems to conserve power and may be particularly beneficial for use in mobile devices that have a limited power supply. These mobile devices typically do not have a consistent power supply other than the battery in the mobile devices. Dynamic frequency scaling may also be used to decrease energy and cooling costs for lightly loaded machines.

Mobile devices are ubiquitous and may include a smartphone, tablet, portable digital assistant (PDA), portable game console, palmtop computer, and other portable electronic devices. In addition to the primary function of these devices, many include peripheral functions. For example, a smartphone may include the primary function of making telephone calls and the peripheral functions of playing a game, a still camera, a video camera, global positioning system (GPS) navigation, web browsing, sending and receiving emails, and sending and receiving text messages. As the functionality of such a device increases, the processing power required to support such functionality also increases. Further, as the computing power increases, there exists a greater need to effectively manage the processor that provides the computing power.

BRIEF SUMMARY

This disclosure relates to CPUs. Methods, systems, and techniques for controlling CPU frequency are provided.

According to some embodiments, a method of throttling a central processing unit (CPU) frequency of at least one CPU includes tracking an average quantity of graphics library calls made per graphics library draw call per frame of rendering. The method further includes detecting, based on tracking the average quantity of graphics library calls made per graphics library draw call per frame of rendering, a gaming workload on a computing device including a CPU. The method also includes switching the computing device to a gaming mode. Switching the computing device to a gaming mode includes reducing a CPU frequency maximum of the CPU executing on the computing device.

According to some embodiments, a system for throttling a central processing unit (CPU) frequency of at least one CPU includes a CPU. The system also includes a gaming mode detector that tracks an average quantity of graphics library calls made per graphics library draw call per frame of rendering and that detects, based on the tracked average quantity of graphics library calls made per graphics library draw call per frame of rendering, a gaming workload on a computing device including the CPU. The gaming mode detector switches the computing device to a gaming mode and reduces a CPU frequency maximum of the CPU executing on the computing device.

According to some embodiments, a computer-readable medium has stored thereon computer-executable instructions for performing operations including: tracking an average quantity of graphics library calls made per graphics library draw call per frame of rendering; detecting, based on tracking the average quantity of graphics library calls made per graphics library draw call per frame of rendering, a gaming workload on a computing device including a CPU; and switching the computing device to a gaming mode, where the switching the computing device to a gaming mode includes reducing a CPU frequency maximum of the CPU executing on the computing device.

According to some embodiments, an apparatus for throttling a central processing unit (CPU) frequency of at least one CPU includes means for tracking an average quantity of graphics library calls made per graphics library draw call per frame of rendering. The apparatus also includes means for detecting a gaming workload on a computing device including a CPU. The apparatus further includes means for reducing a CPU frequency maximum of the CPU executing on the computing device.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
   A. Detect Gaming Workload
      1. State-Update/Draw (SUPD) Metric
      2. SUPD and Bind-Texture Draw (BTPD) Metrics
   B. Switch to a Gaming Mode
III. Example Method
IV. Example Computing Device

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Mobile gaming has become popular and enables a user to play games on his or her mobile device. A good number of popular games (e.g., Need For Speed—Most Wanted™, Asphalt-7™, and Asphalt-8™) are heavily graphics processing unit (GPU) bound rather than "CPU bound." Trademarks are the property of their respective owners. The CPU constructs the draw commands based on the draw calls for the game, generates a command stream based on the draw commands, and submits the command stream to the GPU. The GPU may then proceed to perform the heavy work of processing the draw commands in the command stream. Although the CPU side workload may not be heavy because the GPU performs the heavy processing of the gaming workload, the CPU may still unnecessarily be running at the maximum supported CPU frequency.

CPU frequency minimum (FMin) corresponds to the minimum allowed CPU frequency that can be used when executing a workload on a computing device. CPU frequency maximum (FMax) corresponds to the maximum allowed CPU frequency that can be used when executing a workload on a computing device. A dynamic CPU frequency scaling routine may operate between a CPU FMin and a CPU FMax on the computing device. Dynamically reducing the CPU FMax causes the dynamic CPU frequency scaling routine to run within a smaller range of CPU frequencies on the computing device.

The CPU frequency is controlled by an on-demand CPU governor interacting with the CPU, and which may cause the CPU to run at a default CPU frequency maximum (e.g., 2.15 gigahertz (GHz)). Although the description may describe an on-demand CPU governor as interacting with the CPU, other governors may interact with the CPU. Examples of other CPU governors are a performance governor, powersave governor, interactive governor, among others. In an example, CPU governors may be available in the Linux™ operating system.

Figure 1:
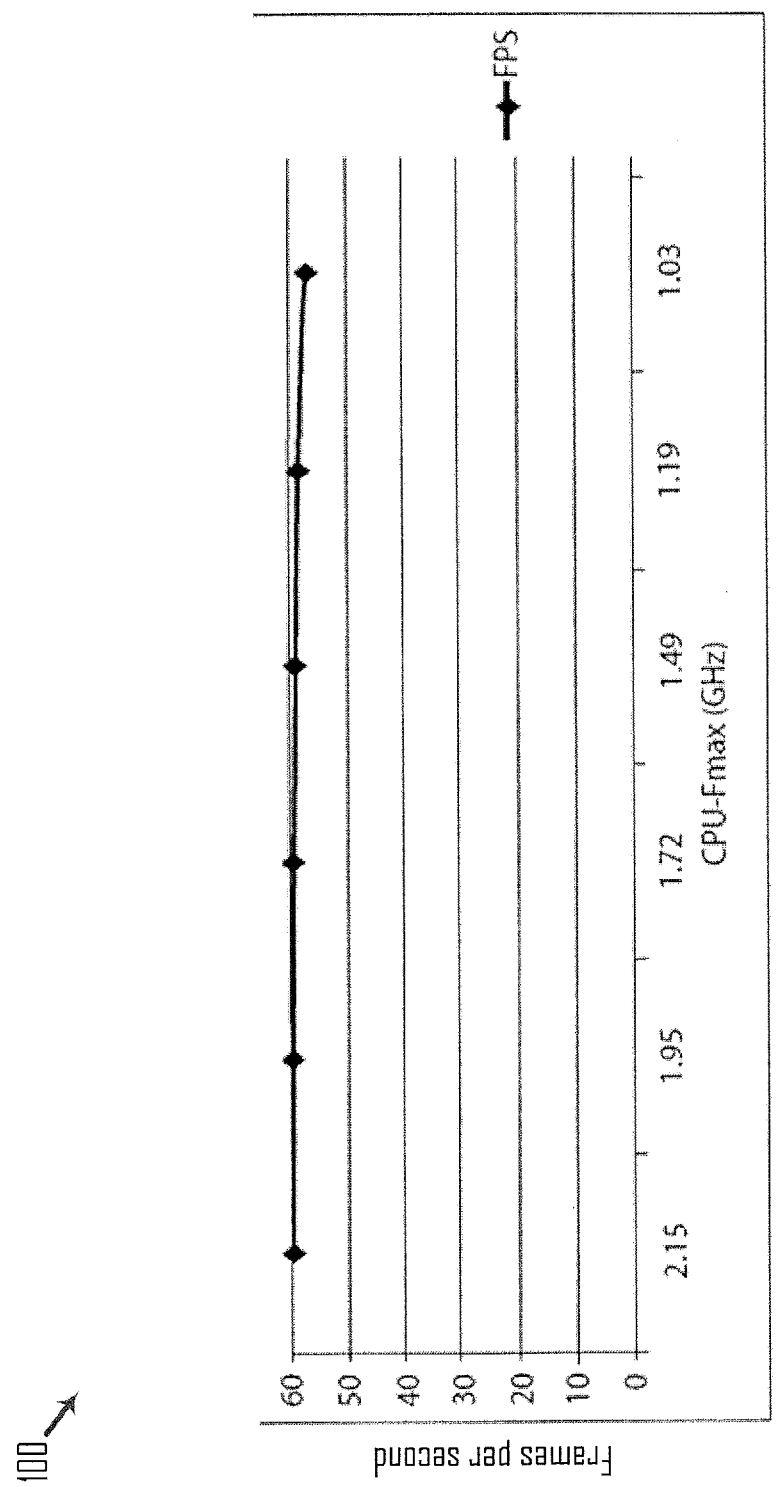
FIG. 1 is an example graph of the FPS versus CPU frequency maximum over time in relation to a particular on-demand CPU governor and the game, Asphalt7™.

FIG. 1 is an example graph of frames per second (FPS) versus CPU frequency maximum over time in relation to a particular on-demand CPU governor while running the game, Asphalt7™. In FIG. 1, the default CPU frequency maximum may be, for example, 2.15 GHz. The CPU governor may control the CPU frequency maximum as will be discussed further below.

In an example, one-third of the CPU time is spent running at the maximum CPU clock, which unnecessarily consumes power. As illustrated in FIG. 1, progressively reducing the CPU FMax to a threshold amount (e.g., 1.95 GHz-1.72 GHz) relative to the display panel refresh rate (e.g., 60 FPS) may result in little or no FPS loss. As shown in FIG. 1, when the CPU FMax is approximately 1.49 GHz, approximately 59 FPS results, and reducing the CPU FMax from the default of 2.15 GHz to 1.49 GHz results in similar performance for Asphalt-7™. It may be undesirable to run the CPU at its default/higher maximum frequency when, for example, approximately the same performance may result by running the CPU at a reduced maximum frequency, and running a CPU at a lower frequency maximum may further yield power savings for the CPU as the CPU governor now has a lower range of CPU frequencies to operate upon.

It may be desirable to identify a gaming workload on a computing device and then selectively and dynamically reduce the CPU FMax on the computing device. This may reduce power consumption to the CPU while the GPU handles the relatively heavy gaming workload. Further, at higher CPU frequency levels thermal heat released from the computing device becomes an important factor. Deterministically controlling CPU FMax then helps to prevent the computing device from easily and unnecessarily becoming hot and causing further thermal throttling of the CPU FMax, resulting in an overall undesirable user experience.

The present disclosure provides techniques based on detection of a gaming workload to proactively control CPU frequency. Accordingly, the CPU FMax may be reduced to reduce the overall power used by the mobile platform during gaming. An embodiment may have an advantage of preserving performance while reducing power consumption and thermal heat.

II. Example System Architecture

Figure 2:
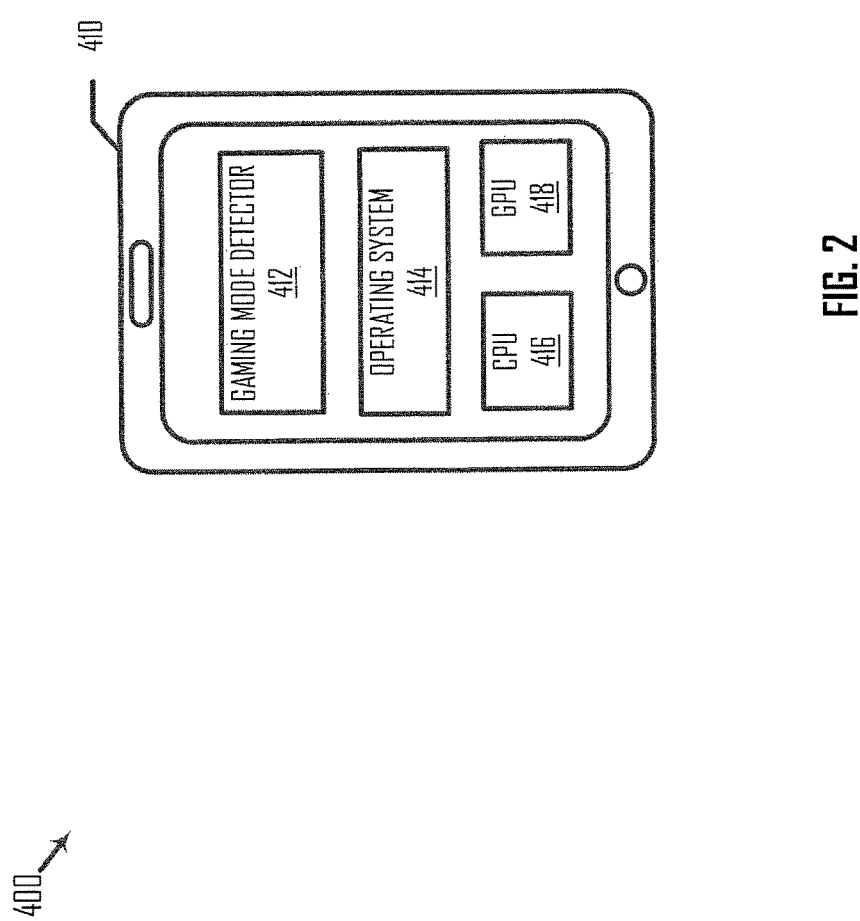
FIG. 2 is a block diagram illustrating a system for throttling a CPU frequency of at least one CPU, according to some embodiments.

FIG. 2 is a block diagram 400 illustrating a system for throttling the CPU frequency of at least one CPU, according to some embodiments. Diagram 400 includes a computing device 410 that includes a gaming mode detector 412, operating system 414, CPU 416, and GPU 418. Gaming mode detector 412, operating system 414, CPU 416, and GPU 418 may execute and perform operations in computing device 410.

Computing device 410 may be a stationary device or a mobile device. The mobile device may be, for example, a smartphone, tablet, laptop, or personal digital assistant. Gaming mode detector 412 preserves the performance of CPU 416 while reducing the overall power used by the mobile platform during gaming.

Gaming mode detector 412 may interact with CPU 416 and manage the frequency at which CPU 416 runs. CPU 416 generates a command stream based on the draw calls and constructs the draw commands to submit to GPU 418. In particular, CPU 416 has access to the quantity of state and draw calls and generates a binary of a graphics library (GL) command that is sent to GPU 418, which processes the workload to execute the draw calls. CPU 416 may determine the processing workload (e.g., a quantity of draw calls) to be sent to GPU 418. It may be undesirable to run CPU 416 at the CPU frequency maximum, however, when GPU 418 is processing a heavy workload (e.g., a game is being played on computing device 410). CPU 416 may pass the information regarding the state and draw calls to gaming mode detector 412, which executes in user space, and which may use the state and draw call information to detect whether computing device 410 has a gaming workload.

When gaming mode detector 412 detects the gaming workload on computing device 410, gaming mode detector 412 may then cap the CPU FMax until computing device 410 is no longer determined to be in the gaming mode. In an example, gaming mode detector 412 reduces the CPU FMax such that other components executing on computing device 410 cannot cause CPU 416 to exceed the reduced CPU FMax. Different governors may run at different frequencies. In an embodiment, CPU 416 includes one or more cores, and a separate CPU FMax may be set for one or more of the cores. When computing device 410 is no longer determined to be in the gaming mode, gaming mode detector 412 may remove or readjust the cap on the CPU FMax or simply increase the reduced CPU FMax to the default level.

Open Graphics Library (OpenGL) is a specification of an application programming interface (API) for rendering two-dimensional and three-dimensional computer graphics. OpenGL implementations are libraries that implement the API defined by the specification. The API is cross-language and multi-platform and is typically used to interact with a GPU to achieve hardware-accelerated rendering. OpenGL is widely used in CAD, virtual reality, scientific visualization, information visualization, flight simulation, and video games. OpenGL for Embedded Systems (OpenGL ES) is a subset of the OpenGL computer graphics rendering API and is designed for embedded systems (e.g., smartphones, computer tablets, video game consoles and PDAs). For brevity, OpenGL or OpenGL ES may be used to describe a technology for rendering computer graphics, but this is not intended to be limiting and it should be understood that other technologies that provide these capabilities are within the scope of the disclosure.

A. Detect Gaming Workload

In some embodiments, gaming mode detector 412 detects a gaming workload on computing device 410, and may do so in a variety of ways. Two OpenGL ES workloads are user interface (UI) and gaming workloads.

1. State-Update/Draw (SUPD) Metric

In an example, gaming mode detector 412 uses an average state-update/draw (SUPD) metric to detect a gaming workload on computing device 410. The SUPD metric is dependent on the gaming workload and is bound to a given draw call. For example, graphics library (GL) calls are APIs used by game applications. The SUPD metric may include tracking an average quantity of all GL calls (e.g., glUniformMatrix, glBindBuffer, gl* etc.) made per single GL draw call (e.g., glDrawElements and glDrawArray) per frame of rendering (e.g., between two eglSwapBuffers). In this example, gaming mode detector 412 may then track how many GL API calls (e.g., state updates) are made before a single draw call. For graphics rendering, a triangle is typically the smallest unit to draw. Gaming mode detector 412 may determine how many GL API calls are made before the particular triangle is drawn. A higher average quantity of GL calls made per GL draw call per frame of rendering may indicate a higher likelihood that the associated workload is bound for GPU 418.

Using the SUPD metric, gaming mode detector 412 may switch computing device 410 from a non-gaming mode to a gaming mode (or from a gaming mode to a non-gaming mode) based on a single rendered frame. This, however, may cause switching back and forth to and from gaming mode continuously on a frame-by-frame basis. It may therefore be more desirable to switch computing device 410 from non-gaming mode to gaming mode (or from gaming mode to non-gaming mode) based on a sustained heavy workload satisfying particular conditions. Using such a heuristic approach, switching to and from gaming mode may be based on a consistent history and avoid false positives. For example, a sliding window may be used to ascertain that a gaming workload characteristic is consistent and not sporadic. In this way, gaming mode detector 412 may distinguish between heavy OpenGL ES-based gaming workloads versus lighter user interface workloads, and thus proactively reduce CPU frequency maximum for the gaming workloads.

In some embodiments incorporating a sliding window spanning a predetermined quantity of consecutive frames, gaming mode detector 412 tracks an average quantity of GL calls per GL draw call per frame of rendering. In an example, for the predetermined window of consecutive frames, when a result of tracking the average quantity of GL calls per GL draw call per frame of rendering satisfies a threshold, gaming mode detector 412 will have detected a gaming workload on computing device 410 because a heavy and sustained workload that is GPU bound may be highly likely when this condition is satisfied. In an example, a result of tracking the average quantity of GL calls per GL draw call per frame of rendering satisfies the threshold when the result is greater than or equal to 25.

Likewise, when the result of tracking the average quantity of GL calls does not reach the threshold of 25, for example, gaming mode detector 412 may determine that computing device 410 is not engaged in gaming activity, and may switch computing device 410 to non-gaming mode. In an embodiment, switching computing device 410 to non-gaming mode includes resetting or readjusting the CPU FMax of the CPU (e.g., increasing the cap on the CPU FMax).

The SUPD threshold may be, for example, approximately 25, exactly 25, or a range from 20-25. It will be understood, however, that the threshold value of 25 is by example, and that other values may apply according to characteristics of various computing devices 410.

In an example, the predetermined quantity of consecutive frames defining the sliding window size is five frames. For a sliding window of N (e.g., five) consecutive frames of the OpenGL ES workload, gaming mode detector 412 tracks an average quantity of GL calls made per GL draw call for each of the N (e.g., five) consecutive frames to be rendered, where N is any whole number greater than zero. If, for example, the SUPD is greater than or equal to 25, gaming mode detector 412 may enter computing device 410 into gaming mode (if computing device 410 is not already in gaming mode).

2. SUPD and Bind-Texture Draw (BTPD) Metrics

In another example, gaming mode detector 412 uses the SUPD and an average bind-texture/draw (BTPD) metric to detect a gaming workload on computing device 410. Before an image is drawn on a screen of computing device 410, a texture may be mapped to a particular triangle to be rendered onscreen. If a game application is executing on computing device 410, CPU 416 may look up multiple textures before CPU 416 issues a draw call and send it to GPU 418. For example, a texture may indicate a color or colors of a triangle, and multiple textures may be determined for a frame. The BTPD metric is dependent on the gaming workload and is bound to a given draw call. The BTPD may include tracking an average quantity of texture calls made per GL draw call (e.g., glDrawElements and glDrawArray) per frame of rendering (e.g., between two eglSwapBuffers). In this example, gaming mode detector 412 may track how many GL API calls (e.g., texture calls) are made before a single draw call. A higher average quantity of texture calls per GL draw call per frame of rendering indicates that more textures are used to render a frame. SUPD and BTPD metrics used thus as a gaming mode detection condition may work well across a broad range of OpenGL ES gaming workloads and can be proactively used to reduce the overall power used by the mobile platform during gaming on a mobile device.

SUPD and BTPD metrics may be used by the gaming mode detector 412 to switch computing device 410 from a non-gaming mode to a gaming mode (or from a gaming mode to a non-gaming mode) based on a single rendered frame. This, however, may cause switching back and forth to and from gaming mode continuously on a frame-by-frame basis. It may be more desirable to switch computing device 410 from non-gaming mode to gaming mode (or from gaming mode to non-gaming mode) based on a sustained heavy workload satisfying particular conditions. On such a heuristic approach, switching to and from the gaming mode may be based on a workload history may avoid false positives.

In some embodiments incorporating a sliding window of a predetermined quantity of consecutive frames, gaming mode detector 412 tracks an average quantity of texture calls per GL draw call per frame of rendering. For a sliding window of M (e.g., five) consecutive frames of the OpenGL ES workload, gaming mode detector 412 tracks an average quantity of texture calls per GL draw call for each of the M (e.g., five) consecutive frames to be rendered, where M is any whole number greater than zero. In an example, for the predetermined quantity of consecutive frames, when a result of tracking the average quantity of GL calls per GL draw call per frame of rendering satisfies a second threshold and when a result of tracking the average quantity of texture calls per GL draw call per frame of rendering satisfies a third threshold, gaming mode detector 412 will have detected a gaming workload on computing device 410. A heavy sustained workload that is GPU bound may be highly likely when this condition is satisfied. Many UI cases have less than an SUPD of 15. In an example, a result of tracking the average quantity of GL calls per GL draw call per frame of rendering satisfies the second threshold when the result is greater than or equal to 15, and a result of tracking the average quantity of texture calls per GL draw call per frame of rendering satisfies the third threshold when the result is greater than 1. It will be understood that the values of 15 and 1 are by example and that other values may be appropriate according to characteristics of various computing devices 410.

Likewise, when the result of tracking an average quantity of graphics library calls does not satisfy the second threshold or when the result of tracking an average quantity of texture calls does not satisfy the third threshold, gaming mode detector 412 may determine that computing device 410 is not engaged in gaming activity, and switch computing device 410 to non-gaming mode. Switching computing device 410 to non-gaming mode may include resetting the CPU FMax of the CPU (e.g., increasing the cap on the CPU FMax). For example, a result of tracking the average quantity of GL calls per GL draw call per frame of rendering does not satisfy the second threshold when the result is less than 15, and a result of tracking the average quantity of texture calls per GL draw call per frame of rendering does not satisfy the third threshold when the result is less than or equal to 1 (e.g., does not exceed 1).

The SUPD threshold may be, for example, approximately 15, exactly 15, or a range from 13-17. The BTPD threshold may be, for example, approximately 1, exactly 1, or a range from 0.8-1.2. In an example, the predetermined quantity of consecutive frames defining the sliding window span is five frames. In another example, the predetermined quantity of frames may be greater than or fewer than five frames, For a sliding window of five consecutive frames of the OpenGL ES workload, gaming mode detector 412 may track the average quantity of GL calls made per GL draw call per each of the five consecutive frames to be rendered and the average quantity of texture calls made per GL draw call per each of the five consecutive frames to be rendered. When the SUPD is greater than or equal to 15 and the BTPD is greater than 1, gaming mode detector 412 may enter computing device 410 into gaming mode (if computing device 410 is not already in the gaming mode).

Games typically have greater than a 1.0 average BTPD and may have a maximum greater than 2.0 throughout the tracking of their workloads. In contrast, UI cases typically have fewer than or equal to a 1.0 average BTPD. Many extreme GPU bound heavy-weight games (e.g., Asphalt-7™ and NFS-MW™) have SUPD counts greater than or equal to 25; while other games (e.g., Beach-Buggy™ and Asphalt-8™) have SUPD counts in the range of 15-25, which are similar to some of the UI use cases. Games are likely to have their BTPD count greater than 1, unlike UI use cases, which typically only have a single texture look-up.

As discussed, the SUPD count may vary. For games requiring heavy workloads, the SUPD count likely goes up to 25. If the SUPD is greater than 15, the workload satisfies a broad category of games. If the SUPD count is between 15 and 25, gaming mode detector 412 may check the texture updates (BTPD) to determine whether they are greater than one. These two conditions may be combined to arrive at a high likelihood that the workload is a gaming workload and to enter computing device 410 into the gaming mode. In other words, gaming mode detector 412 may enter computing device 410 into gaming mode if the following condition is satisfied for a sliding window of 5 consecutive frames of the GLES workload: if (SUPD>=25) OR if (SUPD>=15 and BTPD>1.0).

B. Switch to a Gaming Mode

As described, gaming mode detector 412 may enter computing device 410 into gaming mode and/or non-gaming mode. In some embodiments, switching computing device 410 from non-gaming mode to gaming mode includes reducing a CPU frequency of CPU 416 by reducing CPU FMax. In this way, power consumption may be reduced while the performance of computing device 410 remains approximately the same while the gaming workload is bound for GPU 418 for processing. Accordingly, the user may not notice any lack of performance after the CPU frequency of CPU 416 is reduced because it does not have to process any of the heavy GPU workload. CPU 416 may typically run at a CPU FMax of 2.15 GHz. In an example, when gaming mode detector 412 switches computing device 410 to the gaming mode, gaming mode detector 412 reduces the CPU FMax from 2.15 GHz to a range between 1.49 GHz and 1.72 GHz.

In another example, CPU FMax of CPU 416 has been increased. Gaming mode detector 412 may then detect that computing device 410 no longer has a gaming workload bound for GPU 418 for processing. The CPU frequency of CPU 416 may then be increased by, for example, removing the cap of the CPU FMax. In another example, when gaming mode detector 412 switches computing device 410 to non-gaming mode, it increases the CPU FMax (e.g., from a range between 1.49 GHz and 1.72 GHz) back to the default 2.15 GHz.

The CPU frequency maximum may be reduced using a variety of techniques. In an example, operating system 414 includes a kernel that exposes a file system node (e.g., "/sys/devices/system/cpu/cpu0/cpufreq/scaling_max_freq" node). Operating system 414 may be, for example, the Linux™ operating system. In some embodiments, gaming mode detector 412 dynamically writes into the file system node the new CPU FMax. When gaming mode detector 412 switches computing device 410 from non-gaming mode to gaming mode, gaming mode detector 412 writes into the node a new CPU FMax less than the current CPU FMax. When gaming mode detector 412 switches computing device 410 from gaming mode to non-gaming mode, gaming mode detector 412 writes into the node a new CPU FMax greater than the current CPU FMax. In some embodiments, gaming mode detector 412 is programmed to modify the CPU FMax itself and instructs CPU 416 to not go above the new CPU FMax.

As discussed above and further emphasized here, FIGS. 1-2 are merely examples, which should not unduly limit the scope of the claims.

III. Example Method

Figure 3:
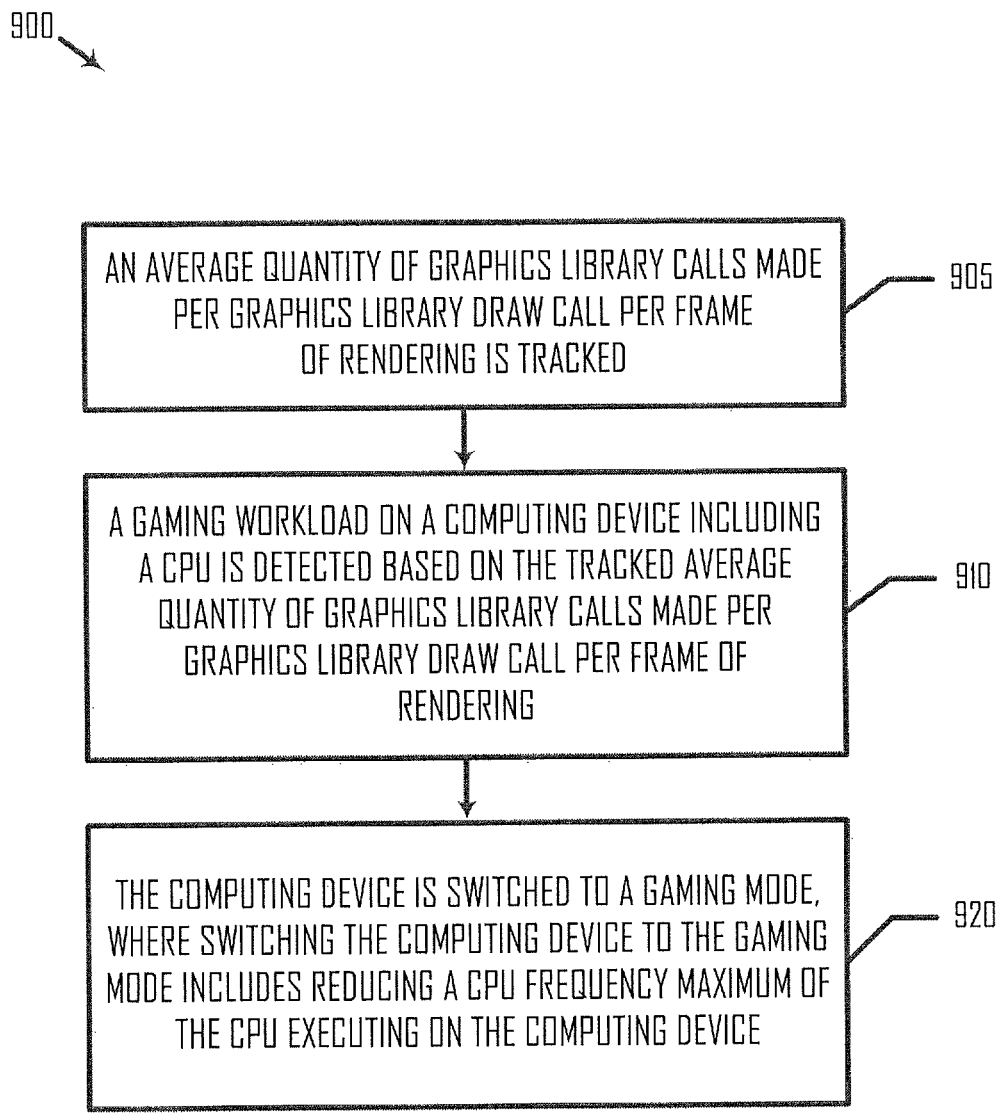
FIG. 3 is a flowchart illustrating a method of scaling a CPU frequency of at least one CPU, according to some embodiments.

FIG. 3 is a flowchart illustrating an example method 900 of throttling a CPU frequency of at least one CPU, according to some embodiments. Method 900 is not meant to be limiting and may be used in other applications.

In a block 905, an average quantity of graphics library calls made per graphics library draw call per frame of rendering is tracked. In an example, this is performed by gaming mode detector 412. In a block 910, a gaming workload on a computing device including a CPU is detected based on the tracked average quantity of graphics library calls made per graphics library draw call per frame of rendering. In an example, gaming mode detector 412 performs this detection for a gaming workload on computing device 410 including CPU 416. In a block 920, the computing device is switched to a gaining mode, where switching the computing device to gaining mode includes reducing a CPU frequency maximum of the CPU executing on the computing device. In an example, gaming mode detector 412 performs the switching, which includes reducing the CPU frequency maximum of CPU 416 executing on computing device 410.

It is also understood that additional processes may be performed before, during, or after blocks 905-920 discussed above. It is also understood that one or more of the blocks of method 900 described herein may be omitted, combined, or performed in a different sequence as desired. In an embodiment, blocks 905-920 may be performed for any number of CPU cores of CPU 416.

IV. Example Computing System

Figure 4:
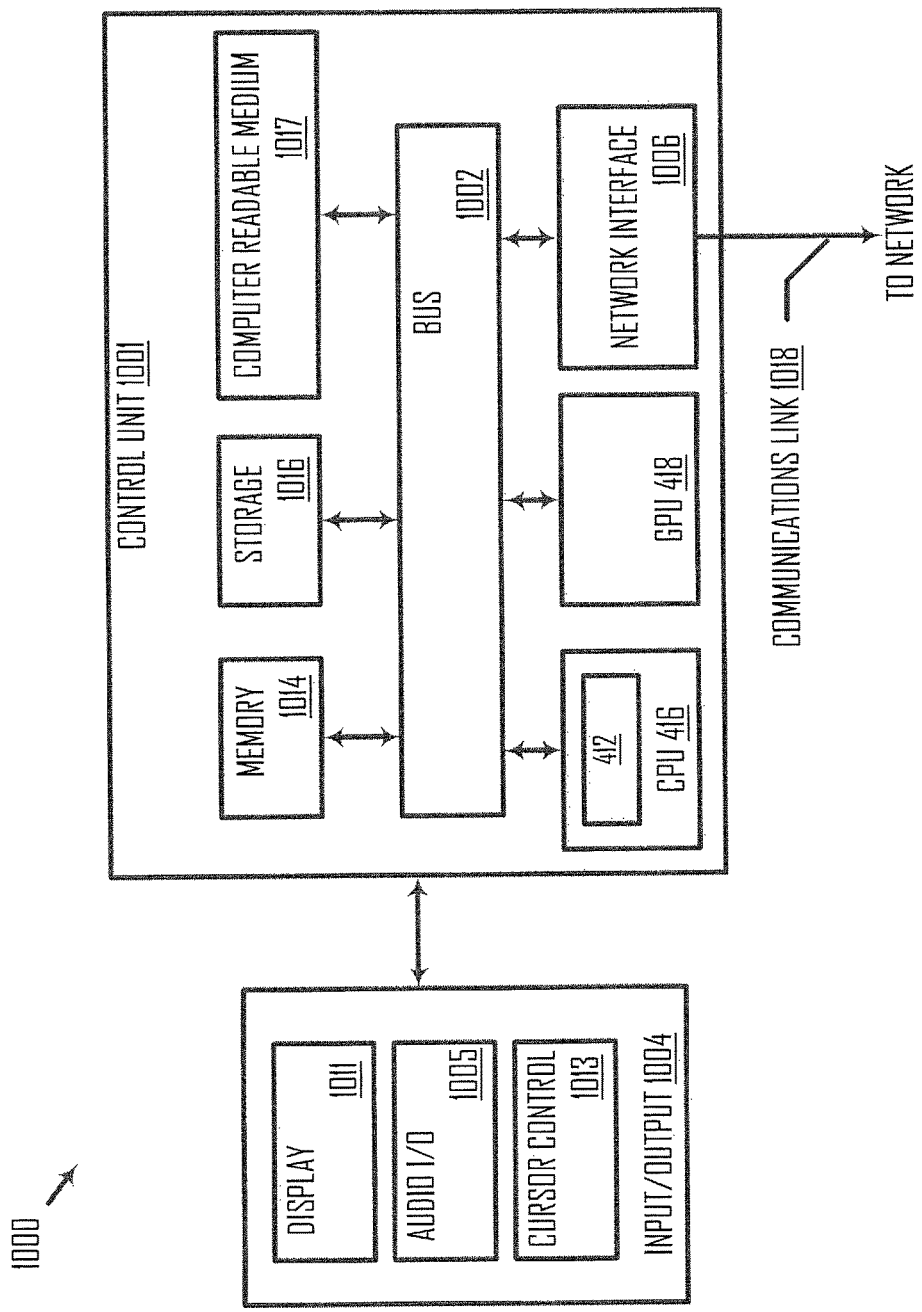
FIG. 4 is a block diagram of a computer system suitable for implementing one or more embodiments of the present disclosure.

FIG. 4 is a block diagram of an example computer system 1000 suitable for implementing any of the embodiments disclosed herein. In various implementations, computer system 1000 may be computing device 410. The computer system 1000 may include one or more processors. The computer system 1000 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 1000 includes a bus 1002 or other communication mechanism for communicating information data, signals, and information between various components of computer system 1000. Components include an input/output (I/O) component 1004 for processing user actions, such as selecting keys from a keypad/keyboard or selecting one or more buttons or links, etc., and sends a corresponding signal to bus 1002. I/O component 1004 may also include an output component such as a display 1011, and an input control such as a cursor control 1013 (such as a keyboard, keypad, mouse, etc.).

An audio I/O component 1005 may also be included to allow a user to use voice for inputting information by converting audio signals into information signals. Audio I/O component 1005 may allow the user to hear audio. A transceiver or network interface 1006 transmits and receives signals between computer system 1000 and other devices via a communication link 1018 to a network. In an embodiment, the transmission is wireless, although other transmission mediums and methods may also be suitable. A processor 416, which may be a micro-controller, digital signal processor (DSP), or other processing component, processes these various signals, such as for display on display 1011 of computer system 1000 or transmission to other devices via communication link 1018. Gaming mode detector 412 may execute in processor 416. Processor 416 may also control transmission of information, such as cookies or IP addresses, to other devices.

Computer system 1000 also includes GPU 418. Processor 416 may send a stream of commands to GPU 418 via bus 1002 and track an average quantity of graphics library calls and an average quantity of texture calls made per graphics library draw call per frame of rendering.

Components of computer system 1000 also include a system memory component 1014 (e.g., RAM), a static storage component 1016 (e.g., ROM), and/or a computer readable medium 1017. Computer system 1000 performs specific operations by processor 1012 and other components by executing one or more sequences of instructions contained in system memory component 1014. Logic may be encoded in computer readable medium 1017, which may refer to any medium that participates in providing instructions to processor 1012 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 1014, and transmission media include coaxial cables, copper wire, and fiber optics, including wires that include bus 1002. In an embodiment, the logic is encoded in non-transitory computer readable medium. Computer readable medium 517 may be any apparatus that can contain, store, communicate, propagate, or transport instructions that are used by or in connection with processor 512. Computer readable medium 517 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

Although bus 1002 is illustrated as being the path that delivers data between processor 416 and GPU 418, this is not intended to be limiting and other embodiments using a different mechanism to deliver data between processor 416 and GPU 418 are within the scope of the disclosure.

In various embodiments of the present disclosure, execution of instruction sequences to practice the present disclosure may be performed by computer system 1000. In various other embodiments of the present disclosure, a plurality of computer systems 1000 coupled by communication link 1018 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa, Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of scaling a central processing unit (CPU) frequency of at least one CPU, the method comprising:
   tracking an average quantity of graphics library calls made per graphics library draw call per frame of rendering;
   detecting, based on the tracking the average quantity of graphics library calls made per graphics library draw call per frame of rendering, a gaming workload on a computing device including a CPU; and
   switching the computing device to a gaming mode in response to detecting the gaming workload, wherein the switching the computing device to the gaming mode includes reducing a CPU frequency maximum (FMax) of the CPU executing on the computing device.

2. The method of claim 1, wherein a sliding window of N consecutive frames is defined, and wherein the tracking includes tracking an average quantity of graphics library calls made per graphics library draw call per each of the N consecutive frames of rendering.

3. The method of claim 1, further including:
   detecting that the computing device is not processing a gaming mode when a result of the tracking does not satisfy a threshold; and
   switching the computing device to a non-gaming mode, wherein the switching the computing device to a non-gaming mode includes resetting the CPU FMax to a maximum allowed frequency.

4. The method of claim 3, wherein the result does not satisfy the threshold when the result is less than 25.

5. The method of claim 3, further including:
   tracking an average quantity of texture calls made per graphics library draw call per frame of rendering; and
   detecting, based on the tracking an average quantity of texture calls made per graphics library draw call per frame of rendering, the gaming workload on the computing device including the CPU.

6. The method of claim 5, wherein a second sliding window of M consecutive frames is defined, and wherein the tracking an average quantity of texture calls includes tracking the average quantity of texture calls made per graphics library draw call for each of the M consecutive frames of rendering.

7. The method of claim 6, wherein when the first result of the tracking an average quantity of graphics library calls satisfies a second threshold and a second result of the tracking an average quantity of texture calls satisfies a third threshold, the gaming workload is detected on the computing device.

8. The method of claim 7, further including:
   when the first result of the tracking an average quantity of graphics library calls does not satisfy the second threshold or when the second result of the tracking an average quantity of texture calls does not satisfy the third threshold, detecting that the computing device is not processing a gaming workload.

9. The method of claim 8, wherein the first sliding window of consecutive frames is five, and the second sliding window of consecutive frames is five.

10. The method of claim 8, wherein when the first result is greater than or equal to 15, the first result satisfies the second threshold, and when the second result is greater than 1, then the second result satisfies the third threshold.

11. The method of claim 1, wherein the tracking an average quantity of graphics library calls includes for every sliding window of N consecutive frames, tracking the average quantity of graphics library calls made per graphics library draw call for each of the N consecutive frames of rendering.

12. The method of claim 11, further including:
   tracking an average quantity of texture calls made per graphics library draw call for each of M consecutive frames of rendering.

13. The method of claim 12, wherein the detecting includes detecting the gaming workload on the computing device when a result of the tracking an average quantity of graphics library calls satisfies a first threshold.

14. The method of claim 13, wherein the detecting includes detecting the gaming workload on the computing device when the first result of the tracking an average quantity of graphics library calls satisfies a second threshold and a second result of the tracking an average quantity of texture calls satisfies a third threshold.

15. The method of claim 14, wherein the first result satisfies the first threshold when the first result is greater than or equal to 25, wherein the first result satisfies the second threshold when the first result is greater than or equal to 15, and wherein the second result satisfies the third threshold when the second result is greater than 1.

16. The method of claim 1, wherein the reducing a CPU FMax includes restricting the CPU FMax of the CPU to a range between 1.49 GHz and 1.72 GHz.

17. The method of claim 1, wherein the computing device includes a kernel, and the reducing a CPU FMax includes invoking an API call in the kernel.

18. The method of claim 1, wherein the computing device is a mobile device.

19. The method of claim 18, wherein the mobile device is a smartphone, tablet, laptop, or personal digital assistant.

20. A system for scaling a central processing unit (CPU) frequency of at least one CPU, the system comprising:
   a CPU; and
   a gaming mode detector that tracks an average quantity of graphics library calls made per graphics library draw call per frame of rendering and detects, based on a result of the tracked average quantity of graphics library calls, a gaming workload on a computing device including the CPU, wherein in response to detecting the gaming workload, the gaming mode detector switches the computing device to a gaming mode and reduces a CPU frequency maximum (FMax) of the CPU executing on the computing device.

21. The system of 20, wherein the gaming mode detector defines a sliding window of N frames and tracks the average quantity of graphics library calls made per graphics library draw call for each of the N consecutive frames of rendering, and wherein the gaming mode detector detects the gaming mode on the computing device when the result satisfies a threshold.

22. The system of claim 21, wherein the gaming mode detector switches the computing device to a non-gaming mode when the computing device is determined to be in the gaming mode and the result does not satisfy the threshold.

23. The system of claim 21, wherein the result satisfies the threshold when the result is greater than or equal to 25.

24. The system of claim 21, wherein the gaming mode detector tracks an average quantity of texture calls made per graphics library draw call for each of M consecutive frames of rendering, and wherein the gaming mode detector detects the gaming workload on the computing device when the first result of tracking the average quantity of graphics library calls satisfies a second threshold and a second result of tracking the average quantity of texture calls satisfies a third threshold.

25. The system of claim 24, wherein the first result satisfies the first threshold when the first result is greater than or equal to 25, wherein the first result satisfies the second threshold when the first result is greater than or equal to 15, and wherein the second result satisfies the third threshold when the second result is greater than 1.

26. The system of claim 20, wherein the gaming mode detector resets the CPU FMax of the CPU to a maximum allowed frequency level of the CPU and increases the CPU FMax of the CPU.

27. A non-transitory computer-readable medium having stored thereon computer-executable instructions for performing operations, comprising:
 tracking an average quantity of graphics library calls made per graphics library draw call per frame of rendering;
 detecting, based on the tracking an average quantity of graphics library calls made per graphics library draw call per frame of rendering, a gaming workload on a computing device including a CPU; and
 switching the computing device to a gaming mode in response to detecting the gaming workload, wherein the switching the computing device to a gaming mode includes reducing a CPU frequency maximum (FMax) of the CPU executing on the computing device.

28. The computer-readable medium of claim 27, the operations further including:
 defining a sliding window of N consecutive frames, wherein the tracking includes tracking an average quantity of graphics library calls made per graphics library draw call for each of the N consecutive frames of rendering; and
 detecting the gaming workload on the computing device when a result of the average quantity of graphics library calls made per graphics library draw call satisfies a threshold.

29. The computer-readable medium of claim 28, the operations further including:
 tracking an average quantity of texture calls made per graphics library draw call for each of M consecutive frames of rendering; and
 detecting the gaming workload on the computing device when a result of the average quantity of graphics library calls made per graphics library draw call satisfies a second threshold and a result of the average quantity of texture calls satisfies a third threshold, wherein the first threshold is different from the second threshold.

30. An apparatus for scaling a central processing unit (CPU) frequency of at least one CPU, the apparatus comprising:
 means for tracking an average quantity of graphics library calls made per graphics library draw call per frame of rendering,
 means for detecting, based on the tracking the average quantity of graphics library calls made per graphics library draw call per frame of rendering, a gaming workload on a computing device including a CPU; and
 means for switching the computing device to a gaming mode in response to detecting the gaming workload, wherein the switching includes reducing a CPU frequency maximum (FMax) of the CPU executing on the computing device.

* * * * *